United States Patent [19]

Mason

[11] Patent Number: 5,016,991
[45] Date of Patent: May 21, 1991

[54] FLEXIBLE, SOLID ELECTROLYTE USEFUL IN ELECTROCHROMIC DEVICES

[75] Inventor: Claude F. Mason, Ypsilanti, Mich.

[73] Assignee: Ford Motor Company, Dearborn, Mich.

[21] Appl. No.: 329,057

[22] Filed: Mar. 27, 1989

[51] Int. Cl.$^5$ .............. H07M 6/04; H01M 6/16; G02F 1/17
[52] U.S. Cl. .................. 350/357; 252/62.2; 429/192
[58] Field of Search ............ 350/357; 252/62.2; 429/192

[56] References Cited

U.S. PATENT DOCUMENTS

| Re. 33,040 | 8/1989  | Kakiuchi          | 350/357  |
|------------|---------|-------------------|----------|
| 3,708,220  | 1/1973  | Meyers et al.     | 350/357  |
| 4,060,311  | 11/1977 | Green             | 350/357  |
| 4,256,379  | 3/1981  | Green             | 350/357  |
| 4,357,401  | 11/1982 | Andre et al.      | 429/192  |
| 4,376,569  | 3/1983  | Barltrop et al.   | 350/357  |
| 4,556,614  | 12/1985 | le Méhauté et al. | 429/192  |
| 4,573,768  | 3/1986  | Polak et al.      | 350/357  |
| 4,798,773  | 1/1989  | Yasukawa et al.   | 252/62.2 |
| 4,844,995  | 7/1989  | Noda et al.       | 252/62.2 |
| 4,960,324  | 10/1990 | Brown             | 350/357  |

FOREIGN PATENT DOCUMENTS

| 0121319 | 7/1984  | Japan          | 350/357 |
|---------|---------|----------------|---------|
| 0017724 | 1/1985  | Japan          | 350/357 |
| 0279317 | 12/1987 | Japan          | 350/357 |
| 3208828 | 8/1988  | Japan          | 350/357 |
| 2111966 | 7/1983  | United Kingdom |         |

OTHER PUBLICATIONS

"A New Family of Organically Modified Silicates Prepared from Gels", by D. Ravaine et al., Journal of Non-Crystalline Solids, 82(1986), 210–219.

"Synthesis of Ionic Conducting Interpenetrating Polymer Networks", by C. K. Chiang et al., Polymer Communications, 1987, vol. 28, Feb.

Primary Examiner—Eugene R. LaRoche
Assistant Examiner—Evelyn A. Lester
Attorney, Agent, or Firm—Lorraine S. Melotik; Roger L. May

[57] ABSTRACT

This invention is directed to a flexible, solid electrolyte useful in an electrochromic device. The electrolyte comprises an interpenetrating polymer network of a alkali metal doped, sol-gel component and an epoxy-amine component.

37 Claims, 1 Drawing Sheet

FLEXIBLE, SOLID ELECTROLYTE USEFUL IN ELECTROCHROMIC DEVICES

TECHNICAL FIELD

This invention is directed to flexible, solid electrolytes and a method for making same. More particularly, the electrolyte comprises an interpenetrating polymer network (IPN) of an alkali metal doped, sol-gel component and an epoxy-amine component.

BACKGROUND OF THE INVENTION

Electrochromic devices are devices in which a physical/chemical change produced in response to the induced electric field results in a change in the reflective (or transmissive properties) of the device with respect to electromagnetic radiations, e.g., uv, visible and IR radiations. Such devices, one embodiment being shown as item 10 in FIG. 1, generally comprise a film of electrochromic material 12 and an ion-conductive insulating layer 14 which functions as an electrolyte layer. The film and the electrolyte layer are in surface contact with each other for exchange of ions between the electrochromic film and the electrolyte layer. Two conductive electrode layers, 16 and 18 in FIG. 1, at least one of them being transparent, are disposed on the opposite outer surfaces of the electrochromic material film and the electrolyte layer to provide means for applying a voltage across the combined thickness of the electrochromic film and the electrolyte layer. The electrode layers, 16 and 18 in FIG. 1, are provided on substrates, 20 and 22 of FIG. 1, which substrates may be of a material such as glass. Depending on the ion providing and ion storage capacity of ion conductive layer 16, a counter electrode located between ion conductive layer 14 and electrode layer 18 may be used. The electrodes are provided with external electrical leads 24 and 26 connected to a voltage providing source 28. Application of a voltage of proper polarity across the electrodes causes coloration of the electrochromic layer. By reversing the polarity of the applied voltage, the colored electrochromic layer will be uncolored (bleached). Changing from the bleached state to the colorless state or from the colored state to the bleached is termed "switching". The electrochromic material may be persistent in either its colored state or its non-colored state. By "persistent" is meant the ability of the material to remain, after removal of the electric field, in the absorptive state to which it is changed, as distinguished from a substantially instantaneous reversion to the initial state. The length of time a material is persistent is called its "open circuit memory" or simply "memory". Electrochromic devices of this type have been described for several uses, such as image display, for light filtering, etc. See, e.g., U.S. Pat. Nos. 3,708,220; 4,194,812; 4,278,329; 4,645,308; 4,436,769; 4,500,878; 4,150,879; 4,652,090; 4,505,021; and 4,664,934.

In such devices, the electrochromic film usually comprises an inorganic metal oxide material, most commonly a transition metal oxide, in particular: tungsten oxide. When tungsten oxide is the electrochromic material, the electrolyte layer is adapted to provide a positively charged light metal cation, preferably, a proton or a lithium ion.

The electrolyte layer is generally a liquid electrolyte solution, typically based on sulfuric acid or lithium perchlorate in propylene carbonate. However, use of a liquid electrolyte has the inherent disadvantage associated with containment of a fluid. That is, it is required with liquid electrolytes used in layered electrochromic devices that the edges of the device be sealed so as to retain the liquid electrolyte. U.S. Pat. No. 3,708,220, proposes to overcome such shortcomings by the use of gelled, sulfuric acid-polymeric electrolytes such as $H_2SO_4$-PVA (polyvinyl alcohol). It is taught therein, that such a gel electrolyte possesses good stability, high viscosity and transparency. Although liquid and gel electrolytes, such as those described in the foregoing patent, may impart good electrochromic performance, problems related to handling and containment of the liquid or gel remain. In addition, the preferred tungsten oxide electrochromic material as well as certain electrode materials are attacked by acidic electrolyte materials, limiting the utility of strong acids for this application.

Another proposed class of electrolytes, i.e., in addition to liquid and gel electrolytes, is solid electrolytes. U.S. Pat. No. 4,256,379 discloses a solid electrolyte of complex halides, particularly iodides, of silver with alkali metal or quaternary ammonium ions, e g., $RbAg_4I_5$. According to the patent teachings, this electrolyte itself is used in contact with an electrode capable of providing ions which are the same as the "fast" ions of the conductor. The "fast" ion is preferably an alkali metal, copper or silver ion, silver being preferred. Additionally, this patent teaches solid electrolytes comprising aluminum compounds such as sodium beta-alumina and potassium beta-alumina. However, these electrolytes are all typically expensive to prepare and, in the case of the alumina compounds, could not be formed directly on components of an electrochromic device since they require very high processing temperatures. U.S. Pat. No. 4,491,392 proposes forming a solid electrolyte comprising a sheet of porous glass impregnated with a solid, ion-conductive silver or alkali metal compound. One disadvantage of employing such an impregnated glass sheet is that, because it is a solid of limited flexibility, it would be difficult to assemble the component layers of an electrochromic device and achieve the intimate contact required between this sheet and the adjacent layers. In "A New Family Of Organically Modified Silicates Prepared from Gels" by D. Ravine et al, Journal of Non-Crystalline Solids 82(1986) 210–219, techniques are disclosed for making lithium conducting solid electrolytes by a sol-gel process. The sol-gel can be made from a mixture of tetramethoxysilane and polyethlene glycol in non-aqueous solvents, e.g., methanol. One disadvantage of such a system is that it has limited flexibility and solidification can take days.

C. K. Chiang et al, In "Synthesis Of Ionic Conducting Interpenetrating Polymer Networks", Polymer Communications, 1987, Vol. 28, Feb., disclose an ionically conducting opaque white solid which comprises a continuous phase of a liquid poly(ethylene oxide)-salt complex in a continuous phase of an amine-crosslinked epoxy phase. The polyethylene oxide is the ion conducting medium, however, the ionic conductivity in polyethylene oxide drop dramatically below its freezing point. Thus, one disadvantage of this polyethylene oxide-salt/epoxy system is that the ionic conductivity of this system at low temperatures is limited by the freezing point of the liquid polyethylene oxide.

It would be highly desirable to provide an electrolyte useful in an electrochromic device, which electrolyte would have substantial flexibility so as to aid in the fabrication of electrochromic devices. At the same time, it would be highly desirable that the electrolyte be a solid so as to avoid problems associated with a liquid or gel electrolyte, e.g., containment and loss of ionic conductivity at low temperatures. It would also be desirable to provide a flexible, solid electrolyte having excellent ionic conductivity for alkali metal ions.

The aforementioned problems of prior art electrolytes are overcome by the flexible, solid electrolyte of the present invention.

BRIEF DESCRIPTION OF THE INVENTION

This invention is directed to a flexible, solid electrolyte adapted for use in an electrochromic device, which electrolyte comprises an interpenetrating polymer network of an alkali metal doped, sol-gel component and an epoxy-amine component. The alkali metal doped, sol-gel component is a reaction product of materials comprising: (i) metal oxide precursor containing hydrolyzable alkoxy groups, (ii) polyether having at least one hydroxyl group per molecule, and (iii) alkali metal salt. The epoxy amine component is the reaction product of materials comprising: (i) polyepoxide and (ii) polyamine crosslinking agent having at least two active amine groups. According to another aspect, this invention is directed to a colorless, transparent, flexible, solid electrolyte adapted for use in an electrochromic device, which electrolyte comprises the above described interpenetrating polymer network. According to this aspect, however, the epoxy-amine component is the reaction product of materials comprising: (i) aliphatic diepoxide containing 14 or less carbon atoms and (ii) polyamine crossing agent containing at least 2 reactive amine groups. Preferably, according to this aspect, the aliphatic diepoxide contains 9 to 11 carbon atoms.

According to still another aspect of the invention, this invention is directed to a method for making a flexible, solid electrolyte comprising an interpenetrating polymer network (IPN) of: (A) alkali metal doped, sol-gel component and (B) epoxy-amine component. The method comprises combining (i) metal oxide precursor containing hydrolyzable alkoxy groups, (ii) polyether having at least one hydroxyl group per molecule, (iii) alkali metal salt, and optionally, (iv) a solvent to form a reaction mixture. According to the method, the reaction mixture is mixed for a time at a temperature sufficient to react at least 50 percent, preferably about 100 percent of the hydrolyzable alkoxy groups present on the metal oxide precursor with the polyether and form a viscous mixture. Thereafter, the method comprises mixing into the viscous mixture (i) polyepoxide and (ii) polyamine crosslinking agent containing at least two reactive amine groups per molecule. Then the viscous mixture comprising the polyepoxide and polyamine crosslinking agent is subjected to a temperature sufficient to cure and form the flexible solid electrolyte. According to the method, substantially all of the solvent which may be present in the viscous mixture is preferably removed from the viscous mixture prior to mixing in the polyepoxide and polyamine crosslinking agent or thereafter. That is, preferably prior to curing of the viscous mixture comprising the polyepoxide and the polyamine crosslinking agent. The invention is also directed to a flexible, solid electrolyte made according to this method.

According to yet another aspect of this method, the method may be employed for making a colorless, transparent, flexible solid electrolyte. In this instance, the epoxy material of the epoxy-amine component is selected from aliphatic diepoxide containing 14 or less carbon atoms. More preferably, according to this aspect, the aliphatic diepoxide contains between about 9 and 11 carbon atoms.

This invention, in still another aspect, is directed to an electrochromic device comprising two substrates and therebetween: one electrode layer; an electrochromic layer; an ion conductive layer; and another electrode layer, at least one of the one electrode layer and the other electrode layer being transparent and each electrode layer being in contact with a respective one of the substrates, the ion conductive layer being adapted to communicate ions to and from the electrochromic layer upon application of a voltage across the electrode layers. According to this aspect, the ion conductive layer comprises the flexible, solid electrolyte described above.

Advantageously, the electrolyte of the present invention is flexible so as to aid in assembly of an electrochromic device, yet solid so as to avoid problems associated with containment of liquid or gel electrolytes. Flexibility is incorporated into the solid sol-gel by means of the epoxy-amine compound. While the electrolyte can be formed in place in the electrochromic device, it advantageously also can be formed into sheets which can be cut to an appropriate shape and assembled into the device. The use of the epoxy-amine component also provides adhesion properties to the electrolyte which aids in maintaining the adjacent layers of the device in intimate contact therewith. Additionally, as compared to conventional alkali metal doped, sol-gel electrolytes, incorporation of the epoxy-amine component advantageously is capable of shortening the solidification time of the mixture from days to hours.

According to an embodiment of the present invention of the electrolyte-advantageously may be a colorless, transparent electrolyte which would find use in those electrochromic devices which, during operation thereof, need to be transparent. Still further, the flexible, solid electrolyte of the present invention exhibits excellent ionic conductivity.

DETAILED DESCRIPTION OF THE INVENTION

Figure 1:
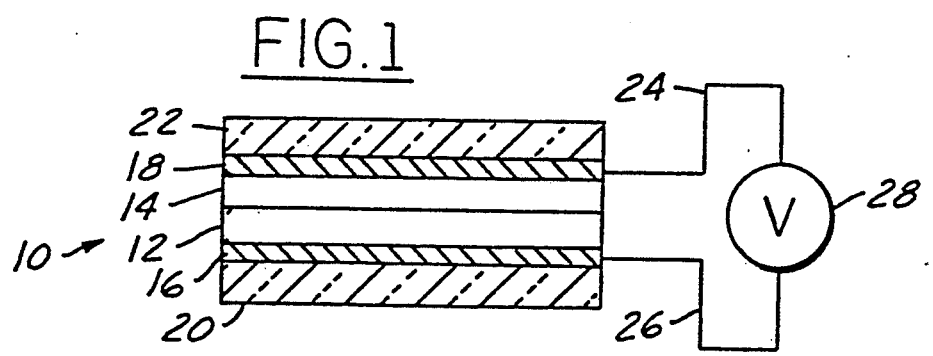
FIG. 1 is a cross-sectional view of a electrochromic device which may employ the flexible, solid electrolyte of the present invention.

This invention is directed to a flexible solid electrolyte adapted for use in electrochromic devices, the electrolyte comprises an interpenetrating polymer network of: (A) alkali metal doped, sol-gel component and (B) epoxy-amine component. Each of these components as well as embodiments of methods useful for making such a flexible, solid electrolyte will be discussed hereinafter in detail.

The alkali metal doped, sol-gel component is a reaction product of materials comprising (i) metal oxide precursor containing hydrolyzable alkoxy groups, (ii) polyether having at least one hydroxyl group per molecule, and (iii) alkali metal salt. The metal oxide precursor containing hydrolyzable alkoxy groups are meant to include any so defined material, which generally has a chemical structure: $M(OR)_x$, wherein R is an organic group, preferably an alkyl group or branched alkyl group of generally less than about 7 carbon atoms, and x is the numerical equivalent of the valence of M. The metal oxide precursor may be selected from, but is not limited to, alkoxides of metals like silicon, aluminum, titanium, and boron such as tetramethyl ortho silicate, aluminum ethoxide and titanium isopropylate. Still other materials suitable as the metal oxide precursor will be apparent to those skilled in the art in view of the present disclosure. Silicates are preferred as the precursor since they desirably react more slowly and thus allow optimal control of the sol-gel component formation. Compatible mixtures of such materials may also be employed as the metal oxide precursor. The polyether having at least one hydroxyl group per molecule employed in forming the sol-gel component may be selected from, but is not limited to, tetraethylene glycol, polypropylene glycol, polyethylene glycol monomethyl ether and octylphenoxypolyethoxy ethanol, the polyethylene oxide and polypropylene oxide type of polyether being preferred. As is known to those skilled in the art, such polyethers may be of various molecular weights. Preferably such polyethers have molecular weights between about 200 and about 1000, with generally at least about 4 repeating ether moieties such as ($-CH_2CH_2O-$) or ($-CH_2CH_3CHO-$) per molecule. Such moieties are believed to provide the ionic conductivity to the electrolyte.

Alkali metal salts are incorporated into the sol-gel network to provide the ionic species (i.e., alkali metal ion) necessary for the function of the electrolyte. Any salt of any of the alkali metals which is compatible with the sol-gel reactants may be used. Exemplary of alkali metal salts which may be so employed in forming the sol-gel component include chlorides, nitrates, sulfates and perchlorates of alkali metals, i.e., such salts as lithium chloride, sodium nitrate, sodium sulfate, and lithium perchlorate. The amount of alkali metal salt to be incorporated into the sol-gel network may vary and would be dependent on such factors as the particular application of the electrolyte material and the type of salt employed. The optimal amount of salt to be incorporated will be apparent to one skilled in the art in view of the present disclosure.

According to one embodiment of a method for making a flexible, solid electrolyte comprising an IPN of the alkali metal doped, sol-gel component and epoxy-amine component, the metal oxide precursor, polyether and alkali metal salt and, optionally, solvent would be mixed to form a reaction mixture. Exemplary of the solvents which may be so employed are alcohols, ethers, ketones, aromatic hydrocarbons, phthalates, as well as compatible mixtures thereof, with alcohols being preferred. Exemplary of useful alcohols are butanol, isopropanol, hexanol, methyl alcohol, ethanol and and the like, with ethyl alcohol being preferred. Ethers which may be used include, but are not limited to, propylene glycol methyl ether, dipropylene glycol methyl ether and dipropylene glycol methyl ether and ethylene glycol ether acetate, with the cellosolve type ethers being preferred. Ketones which may be so employed include methyl butyl ketone, methylisobutyl ketone, methyl propyl ketone, methyl ethyl ketone, etc. Blends of such solvents may thus be employed as the solvent in this invention. While solvents which may be used have been disclosed above, this disclosure is not meant to be limiting. Other suitable organic solvents which may be used to form the reaction mixture will be apparent to those skilled in the art in view of the present disclosure.

The pH of the mixture is generally adjusted with an acid to provide the mixture with a pH between about 2 and about 4. Inorganic and organic acids may be so employed and include, but are not limited to, nitric acid, sulfuric acid, and acetic acid.

Optional materials which may be included in the reaction mixture include, e.g., alpha-alumina, cabo-sil as inert fillers to give more mechanical stability. While numerous metal oxide precursors, polyethers and alkali metal salts which may be employed in the present invention to make the sol-gel component have been disclosed herein, still other such materials useful in this invention will be apparent to those skilled in the art in view of the present disclosure. The ratio of these reactants as used in forming the reaction mixture may vary widely while still forming a suitable electrolyte. Preferably, the ratio of the precursor to the polyether is between about 2:1 and about 1:4 by volume. The optimal ratio would be dependent on the desired physical properties of the electrolyte. For example, if a denser, more rigid, solid electrolyte is desired, the ratio of precursor to polyether would preferably be between about 1:1 and about 1:3 by volume. Nonetheless, in spite of which, if any, reactant is used in excess, all of the reactant materials used to form the sol-gel component would be expected to crosslink to form a solid sol-gel with time. Sol-gel technology is well known to those skilled in the art. It is described, for example, in "A New Family Of Organically Modified Silicates Prepared From Gels", D. Ravaine et al, Journal of Non-Crystalline Solids 82 (1986), p. 210–219 and U.S. Pat. No. 4,476,156 and 4,731,264, the teachings of which relative sol-gel techniques are hereby expressly incorporated by reference.

According to the embodiment of the method disclosed herein, the reactants for forming the sol-gel component are reacted for a period of time at a temperature so as to react at least about 50 percent of the alkoxy groups present on the metal oxide precursor, preferably about 100 percent of such groups are reacted. The completeness of the alkoxy reaction can be determined by means such as nuclear magnetic resonance and infrared spectroscopy. According to this method, the reaction mixture would be mixed for a time at a temperature sufficient to react at least about 50 percent of the hydrolyzable ethoxy groups present on the metal oxide precursor with the polyether having at least one hydroxyl group per molecule and form a viscous mixture. It is believed that as a result of reactions comprising exchange reactions between the alkoxy group and the hydroxyl group of the polyether, the viscous mixture would include oligomeric chains of: —(-M—PE—M—PE)—, wherein M is the metal of the metal oxide precursor and PE is the polyether fragment, having various lengths with crosslinking between chains being likely. If solvent had been employed in forming the viscous mixture, at this point, substantially all of the solvent could be removed. This may be done by vacuum evaporation, heating under a dry atmosphere, or under flowing hot dry air.

Thereafter, in order to form the epoxy-amine polymer network, polyepoxide and polyamine crosslinking agent, containing at least two reactive amine groups per molecule, are mixed into the viscous mixture described above (which may be substantially solventless). The amount of sol-gel component (A) and epoxy-amine component (B) which are mixed together may vary widely. The optimal ratio will depend on the Particular materials employed to make the components and the intended physical properties desired of the flexible, solid electrolyte product. According to certain embodiments as shown in the examples and used in electrochromic devices, this ratio was preferably about 2:1 by volume. Such ratio is not, however, meant to be limiting to the invention disclosed herein.

The term polyepoxide as herein used means epoxide compounds or polymers containing two or more epoxide groups wherein the polyepoxide may be substituted with non-interfering functionality (that is functionality which does not interfere with the intended reaction of epoxide and reactive amine), such as hydroxyl. Preferably, this polyepoxide contains, on the average, about two epoxide groups per molecule. Polyepoxide resins useful in the invention are Preferably selected from aliphatic, cycloaliphatic and aromatic polyepoxides, preferably having a number average molecular weight between about 140 and about 3000. Such polyepoxides are well known in the art and any of these may be employed in the present invention. Among the many suitable types of polyepoxides that was disclosed in U.S. Pat. Nos. 3,404,018, 2,528,359, 2,528,360, 3,198,850, 3,960,979 and 4,018,848. U.S. Pat. No. 3,404,018 discloses several particularly suitable types of polyepoxides including: (1) polyglycidyl ethers of polyhydric alcohols and polyhydric phenols; (2) epoxidized esters of polyethylenically unsaturated monocarboxylic acids; (3) glycidyl esters of poly-basic acids; (4) epoxidized esters of unsaturated monohydric alcohols and polycarboxyl acids; and (5) epoxidized polymers and copolymers of diolefins. Such materials are commercially available, for example, as Epon 828 and 830 (Shell Chemical Co.) and Araldite 6010 and 6020 (Ciba-Geigy). Many polyepoxides other than those recited in this or other referenced Patents will be apparent to those skilled in the art. Compatible mixtures of any of these polyepoxide are also suitable.

According to the embodiment of the present invention where it is desired to make a colorless, transparent, flexible, solid electrolyte, it is necessary that the polyepoxide be an aliphatic diepoxide containing less than about 14 carbon atoms, preferably between about 9 and 11 carbon atoms. Such aliphatic diepoxides include, but are not limited to, 1,4-butanediol diglycidyl ether and polyethylene gylcol diglycidyl ether.

The polyamine crosslinking agent employed in the present invention to form the epoxy-amine component contains at least two reactive amine groups. Thus the polyamine may contain, for example, one primary amine group and a secondary amine group or two secondary amine groups, preferably the polyamine contains at least two secondary amine groups. During the formation (curing) of the epoxy-amine component of the electrolyte, reaction will take place between the active amine hydrogens of the polyamine and epoxide groups of the polyepoxide. The polyamine may contain other functionality, which would not hinder the intended epoxide-amine reaction, such functionality which may be present may be an amide. Suitable commercially available polyamines which may be employed in this invention include 3-dimethylamino propylamine, diethylene triamine and 3-dimethylamino propylamine, with diethylene triamine being preferred. Other polyamines may include diethylaminobutylamine, dibutylaminoethylamine, etc., (available from and a trademark of BASF Wyandotte Corp., Wyandotte, Mich.). Suitable commercially available fatty Polyamine which may be employed in this invention include N-Tallow Bis(aminopropyl) amine (XC95) from Henkel Corporation, Minneapolis, Minn. Mixtures of polyamines as described above could also be employed in this invention as the polyamine reactant. Preferably, the polyamine has weight average ($M_w$) molecular weight between about 60 and about 150, more preferably between about 80 and about 110. The epoxy and the polyamine are combined in the reaction mixture in amounts so as to provide preferably between about 4 and about 1 and, more preferably, between about 3 and about 2 active amine hydrogens on the polyamine for each epoxide group present on the polyepoxy.

If the solvent has not been removed from the mixture prior to incorporation of the polyepoxide and polyamine, preferably it would be removed to form a substantially solventless mixture prior to curing of the polyepoxide and polyamine in the mixture. The viscous mixture comprising the polyepoxide and the polyamine crosslinking agent, which is preferably substantially solventless, is then subjected to a temperature sufficient to cure it and form the flexible, solid electrolyte. During this time, not only is the polyamine crosslinking agent reacting with the diepoxide to form the epoxide-amine polymer network, but also it is believed that the sol-gel component may be undergoing further reaction to form its final polymer network. For example, further reactions of the sol-gel component forming reactants is believed to comprise reactions between different polyether fragments to form longer polyether-metal oxide structures. If the polyepoxide employed in forming the electrolyte is a aliphatic diepoxide containing less than about 14 carbon atoms, the resultant electrolyte will be colorless and transparent. If another type of polyepoxide has been used in forming the electrolyte, the resultant solid electrolyte will not be colorless and transparent but rather will be opaque.

As would be apparent to one skilled in the art in view of the present disclosure, if one would intend to use the electrolyte in a device in which it was intended that only one of the substrates was clear such as in a display device, the opaque or transparent, colorless electrolyte material could be used as the electrolyte of the device. On the other hand, if it is intended to have a transparent electrochromic device, then the colorless, transparent solid electrolyte of this invention would be used therein.

The electrodes used in the electrochromic device of this invention may be any material which is electronically conductive. At least one of the electrode-substrate combinations is transparent, although both may be. If it is intended that the electrode be a light transmitting electrode, there may be used a light transmitting film of an electrically conductive metal oxide such as doped or undoped tin oxide, indium oxide, zinc oxide and the like. The thickness of the transparent electrode layer generally falls within the range of 200 nm to several microns, correspondingly varying in transparency and resistance.

The transparent electrode layer may be formed on the substrates, either of items 20 and 22 of FIG. 1 by any known technique, including vacuum evaporation, chemical vapor deposition, sol-gel deposition, ion plating, reactive sputtering, etc. The substrates, at one of which is transparent, can be plastic, quartz, glass, etc. The transparent electrode layer may be formed by the so-called thick film processes such as screen printing or coating. When the thick batch film process are used, (1) a paste containing metal compound micro particles or (2) a solution of an organic metal compound such as metal alcoholate or its oligomer is coated and sintered to form the transparent electrode layer. Preferably, the transparent electrode material is tin oxide doped with fluorine. The non-transparent electrode material selected from light-reflecting electrode materials (e.g., Al, Ag, Pt or Ni) or other electrode materials (e.g., Au, Pd, Cr, Ir, Ru, Rh or C).

The electrochromic layer may be selected from any electrochromic material, many of which are well known to those skilled in the art and commercially available. Cathodic electrochromic materials include non-stoichiometric (i.e., oxygen deficient) metal oxides wherein the metal has variable oxidation states. Exemplary of such cathodic electrochromic materials useful in this invention are those selected from the group comprising tungsten oxide, molybdenum oxide, vanadium oxide, titanium oxide, lead oxide, and bismuth oxide and compatible mixtures of any of them. Anodic electrochromic materials which may be used in this invention include full oxidized compounds comprising metal wherein the metal has variable oxidation states. Exemplary of such anodic electrochromic materials are and iridium oxide, and nickel hydroxide and compatible mixtures of any of them. Preferred electrochromic materials for use in electrochromic devices of this invention include non-stoichiometric, oxygen deficient tungsten oxide as the cathodic electrochromic material and fully oxidized iridium oxide as an anodic electrochromic material.

Usually the thickness of the electrochromic layer is between about 0.1 and 100 microns. However, since a small potential will provide an enormous field strength across very thin films, films of 0.1-10 microns thickness are preferred over thicker ones. Optimal thickness also will be determined by the material of the film. The electrochromic layer may be provided on the electrode layer by any suitable technique, for example, by vacuum deposition, chemical vapor deposition, electrolytic, thermal evaporation, sputtering sol-gel deposition, and the like. Selection of the optimal electrochromic material and method of its deposition will be apparent to those skilled in the art in view of the present disclosure.

In the embodiment of the device shown in FIG. 1, the device could be formed by applying a cured electrolyte material 14 between electrochromic layer 12 and electrode 18. That is, a layer of the flexible, solid electrolyte which has been previously cast, e.g., on a support, or otherwise shaped into sheets or plates, be sandwiched between the electrochromic layer 12 and electrode 18. On the other hand, the uncured, preferably solventless, mixture comprising the sol-gel component and polyepoxide and polyamine as described above could be deposited directly on a support of the electrochromic device, e.g., either the electrode 18 or electrochromic material layer 12. Thereafter, (i) the material could be cured in place and the device subsequently assembled or (ii) the the device could be assembled as shown (with an uncured electrolyte layer made according to this invention) and subjected to a temperature for a time sufficient to cure the electrolyte layer in place. It is preferable to provide a solventless viscous mixture comprising the sol-gel component, polyepoxide and polyamine prior to curing on-a support of the electrochromic device, assemble the device, and thereafter cure the mixture in place. It has been found that doing so allows the electrolyte layer to seal to the adjacent layers (e.g., the electrochromic material and the electrode) it comes in contact with, there providing better contact between the electrolyte and each of the adjacent layers as well as acting as an adhesive laminant for the device. The thickness of the electrolyte may vary widely. Selection of the optimal thickness will be apparent to one skilled in the art in view of the present disclosure.

As would be apparent to those skilled in the art in view of the present disclosure, the electrochromic device of this invention employing the flexible, solid electrolyte may comprise other components, e.g., counter electrodes, a second electrochromic layer, etc.. Counter electrodes are generally employed between the ion conductive layer and an electrode of the device (i.e., between ion conductive layer 14 and electrode layer 18 of the device of FIG. 1) to improve operation of the device. A counter electrode may be formed of, e.g., $WO_3$ doped with an alkali metal ion. This counter electrode material is generally not meant to be electrochromic.

While this invention has been found to be particularly useful in electrochromic devices, its use is not to be limited to electrochromic devices. The flexible, solid electrolyte of the invention may be used in any application wherein this type of electrolyte would be suitable, e.g., in a battery or chemical sensor.

The invention will be further understood by referring to the following detailed examples which exemplify embodiments of flexible, solid electrolytes made according to the present invention. It should be understood that the specific examples are presented by way of illustration and not by way of limitation.

EXAMPLE 1

In a one liter glass jar, mix 170 ml of dry methanol, 0.02 ml of 10% nitric acid, and 60 ml of tetramethyl orthosilicate. Loosely close the jar, stir and heat the mixture to approximately 50° C. Add 120 ml of tetraethylene glycol to the mixture, loosely close the jar and continue to stir and heat the mixture at approximately 50° C. for approximately 2 hours. To this mixture, then add 75 gm of lithium nitrate which is dissolved in 250 ml of methanol. Loosely close the jar and continue to stir and heat (50° C.) the mixture under dry air for an additional 24 hours. Vacuum dry the mixture in a vacuum oven at 75° C. (0.1 in. Hg) until all bubbling ceases indicating that the methanol has been removed.

To 6 parts (hereinafter meaning parts by weight) of the dried mixture add 2 parts epoxy (1,4-butanediol diglycidyl ether) and 1 part crosslinking agent (diethylene triamine) and mix thoroughly. The resultant mixture is then provided as a layer approximately 0.2 mm thick onto an electrode layer adherent to a glass substrate (corresponding to conductive layer 16 adherent to substrate 20 of FIG. 1). A tungsten oxide electrochromic layer applied to an electrode adherent to another glass substrate (corresponding to electrochromic layer 12 applied to conductive layer 18 applied to substrate 22 of FIG. 1) is used to press the electrolyte layer flat and complete the electrochromic device. Microscope cover glass slides can be used as spacers at the outer edges of the device while pressing the electrolyte flat. The material is allowed to partially cure (solidify) at room temperature for 2-3 hours and is caused to fully cure in 3-4 hours at 80° C. to form a colorless, transparent electrolyte. After fully curing the electrolyte mixture, the edges of the device are sealed with a coating of polybutylene to cause the device to be air tight and keep out moisture. The electrode layers of the device are connected to a voltage source and subjected to cycling. The device performs well during cycling.

EXAMPLE 2

Following generally the procedural techniques of Example 1, mix 170 ml of dry ethanol, 0.02 ml of 5% sulfuric acid, and 60 ml of tetramethyl orthosilicate. Stir and heat the mixture to approximate 50° C., and then add 120 ml of polyethylene glycol (avg. mol. wt. 400). Stir and heat the mixture at approximately 50° C. for approximately 2 hours, and then add 75 gm of lithium nitrate which has been dissolved in methanol. Stir and heat (50° C.) the mixture for an additional 24 hours. Vacuum dry the mixture at 75° C. until bubbling ceases to remove the ethanol.

To 6 parts of the dried mixture add 2 parts epoxy (1,4-butanediol diglycidyl ether) and 1 part hardener (triethylene tetraamine) and mix thoroughly to form a mixture. Then insert the mixture into an electrochromic cell as in Example 1. The mixture Partially cures (solidifies) in 2-3 hours at room temperature and fully cures in 3-4 hours at 80° C. to form a colorless, transparent electrolyte. The electrode layers of the device are connected to a voltage source and subjected to cycling. The device performs well during cycling.

EXAMPLE 3

Following generally the procedural techniques of Example 1, mix 170 ml of dry methanol, 0.02 ml of 10% nitric acid, and 60 ml of aluminum ethoxide. Stir and heat the mixture to approximate 50° C. Then add 90 ml of tetraethylene glycol and stir and heat the mixture at approximately 50° C. for approximately 2 hours. Add 75 gm of lithium nitrate which is dissolved in 250 ml of methanol to the mixture. Stir and heat (50°) this mixture for an additional 24 hours. Then vacuum dry the mixture at 75° C. to until bubbling ceases to remove all the methanol.

To 6 parts of the dried mixture, add 2 parts epoxy (1,4-butanediol diglycidyl ether) and 1 part hardener (diethylene triamine) and mix thoroughly. Then provide a layer of this mixture and form an electrochromic device as in Example 1. The mixture partially cures solidifies) in 2-3 hours at room temperature and fully cures in 3-4 hours at 80° C. in the device to form a colorless, transparent electrolyte. The device is sealed as described in Example 1. The electrode layers of the device are connected to a voltage source and subjected to cycling. The device performs well during cycling.

EXAMPLE 4

Following generally the procedural techniques of Example 1, mix 170 ml of dry methanol, 0.02 ml of 5% sulfuric acid, and 60 ml of tetraethyl orthosilicate. Stir and heat the mixture to approximate 50° C. Then add 180 ml of tetraethylene glycol and stir and heat the mixture at approximately 50° C. for approximately 2 hours. To the mixture is then added 128 gm of lithium perchlorate which has been dissolved in 250 ml of methanol. Stir and heat (50° C.) the mixture for an additional 24 hours. Subsequently vacuum dry the mixture at 75° C. until all bubbling ceases to remove all the methanol.

To 6 parts of the dried mixture, add 3 parts epoxy (1,4-butanediol diglycidyl ether) and 1 part hardener (diethylene triamine) and mix thoroughly. The mixture is provided onto a layer of electrochromic material and an electrochromic device assembled generally according to the techniques of Example 1. The mixture partially cures (solidifies) in 2-3 hours at room temperature and fully cures in 3-4 hours at 80° C. to form a colorless, transparent electrolyte. The device is sealed as described in Example 1 to seal out moisture. The electrode layers of the device are connected to a voltage source and subjected to cycling. The device performs well during cycling.

EXAMPLE 5

Following generally the procedural techniques of Example 1, mix 170 ml of dry ethanol, 0.02 ml of 10% nitric acid, and 60 ml of tetramethyl orthosilicate. Stir and heat the mixture to approximate 50° C. Add 120 ml of polypropylene glycol (avg. mol. wt. 425) to the mixture and then stir and heat the mixture at approximately 50° C. for approximately 2 hours. Add 128 gm of lithium perchlorate which has been dissolved in 250 ml of methanol to the mixture and then stir and heat (50°) the resultant mixture for an additional 24 hours. Vacuum dry this mixture at 75° C. until bubbling ceases to remove the ethanol.

To 6 parts of the dried mixture, add 2 parts epoxy (polyethyleneglycol diglycidyl ether) and 1 part hardener (diethylene triamine) and mix thoroughly. The mixture is provided onto a support in about a 0.2 mm thickness and it partially cures (solidifies) in approximately 5 hours at room temperature and fully cures in 4-5 hours at 80° C. The cured colorless, transparent electrolyte layer is removed from the support and cut to correspond to the surface area of an electrode as described in Example 1. It is then placed between an electrode/glass substrate configuration and an electrochromic layer/electrode layer/glass substrate configuration to form an electrochromic device as in Example 1. The device is sealed as described in Example 1 to exclude moisture from the electrochromic device. The electrode layers of the device are connected to a voltage source and subjected to cycling. The device performs well during cycling.

EXAMPLE 6

Following generally the procedural techniques of Example 1, mix 170 ml of dry methanol, 0.02 ml of 10% nitric acid, and 60 ml of tetraethyl orthosilicate. Stir and heat the mixture to approximate 50° C. Then add 120 ml of tetraethylene glycol and stir and heat the mixture at approximately 50° C. for approximately 2 hours. Thereafter to the mixture add 85 gm of sodium nitrate which has been dissolved in 250 ml of methanol. Stir and continue heating the resultant mixture at 50° C. for an additional 24 hours. Then vacuum dry the mixture at 75° C. until bubbling ceases to remove the methanol.

To 6 parts of the dried mixture, add 1.5 parts epoxy (polyethylene glycol diglycidyl ether) and 1 part hardener (tetraethylene pentamine) and mix thoroughly. The mixture is used in making an electrochromic device as in Example 1. After being provided in a device, it is cured (solidified) in approximately 5 hours at room temperature and fully cured in 4-5 hours at 80° C. to form a colorless, transparent electrolyte. Thereafter the device is sealed as in Example 1 to exclude moisture from the device. The electrode layers of the device are connected to a voltage source and subjected to cycling. The device performs well during cycling.

In view of the disclosure, many modifications of this invention will be apparent to those skilled in the art. It is intended that all such modifications which fall within the true scope of this invention be included with the terms of the appended claims.

I claim:

1. A flexible, solid electrolyte comprising an interpenetrating polymer network of: (A) alkali metal doped, sol-gel component and (B) epoxy-amine component, said alkali metal doped, sol-gel component (A) being the reaction product of materials comprising: (i) metal oxide precursor containing hydrolyzable alkoxy groups, (ii) polyether having at least one hydroxyl group per molecule, and (iii) alkali metal salt, and said epoxy-amine component (B) being the reaction product of materials comprising: (i) polyepoxide and (ii) polyamine crosslinking agent containing at least two reactive amine groups.

2. The flexible, solid electrolyte according to claim 1, wherein said metal oxide precursor is selected from tetramethyl orthosilicate, aluminum ethoxide and titanium isopropylate.

3. The flexible, solid electrolyte according to claim 1, wherein said polyether having at least one hydroxyl group per molecule is selected from polyethylene glycol, polypropylene glycol, and polyethylene glycol monomethylether.

4. The flexible, solid electrolyte according to claim 1, wherein said alkali metal salt is selected from salts of lithium and sodium.

5. A colorless, transparent, flexible solid electrolyte adapted for use in an electrochromic device, said electrolyte comprising an interpenetrating polymer network of: (A) alkali metal doped, sol-gel component and (B) epoxy-amine component, said alkali metal doped, sol-gel component (A) being the reaction product of materials comprising: (i) metal oxide precursor containing hydrolyzable alkoxy groups, (ii) polyether having at least one hydroxyl group per molecule, and (iii) alkali metal salt, said epoxy-amine component (B) being the reaction product of materials comprising: (i) aliphatic diepoxide containing 10 or less carbon atoms and (ii) polyamine crosslinking agent containing at least two reactive amine groups.

6. The flexible, solid electrolyte according to claim 5, wherein said metal oxide precursor is selected from tetramethyl orthosilicate, aluminum ethoxide and titanium isopropylate.

7. The flexible, solid electrolyte according to claim 5, wherein said polyether having at least one hydroxyl group per molecule is selected from polyethylene glycol, polypropylene glycol, and polyethylene glycol monomethylether.

8. The flexible, solid electrolyte according to claim 5, wherein said alkali metal salt is selected from salts of lithium and sodium.

9. A method for making a flexible solid electrolyte comprising an interpenetrating polymer network of: (A) alkali metal doped, sol-gel component and (B) epoxy-amine component, said method comprising:

combining (i) metal oxide precursor containing hydrolyzable alkoxy groups, (ii) polyether having at least one hydroxyl group per molecule, (iii) alkali metal salt, and, optionally, (iv) solvent to form a reaction mixture;

mixing said reaction mixture for a time at a temperature sufficient to react at least 50% of said hydrolyzable alkoxy groups present on said metal oxide precursor and form a viscous mixture;

mixing into the viscous mixture (i) polyepoxide and (ii) polyamine crosslinking agent containing at least two reactive amine groups, and subjecting said viscous mixture comprising said polyepoxide and said polyamine crosslinking agent to a temperature sufficient to cure it and form said flexible solid electrolyte.

10. The method according to claim 9, which further comprises removing said solvent from said viscous mixture prior to curing of said viscous mixture comprising said polyepoxide and said polyamine crosslinking agent.

11. The method according to claim 9, which further comprises providing said viscous mixture comprising said polyepoxide and said polyamine crosslinking agent, prior to curing, on a support.

12. The method according to claim 9, wherein said component (A) and said component (B) are employed in a volume ratio of about 2:1.

13. The method according to claim 9, wherein said metal oxide precursor (i) and said polyether (ii) are combined in said reaction mixture in a volume ratio between about 2:1 and about 1:4.

14. The method according to claim 11, wherein said polyepoxide is a diepoxide.

15. The method according to claim 14, wherein said diepoxide is selected from aliphatic diepoxides containing 14 or less carbon atoms.

16. The method according to claim 14, wherein said diepoxide is selected from aliphatic diepoxides containing 14 or less carbon atoms and said support is a component of an electrochromic device.

17. The method according to claim 16, wherein said support is selected from a layer of electrochromic material and a layer of electrode material.

18. The method according to claim 9, wherein said polyether having at least one hydroxyl group per molecule is selected from polyethylene oxides and polypropylene oxides.

19. The method according to claim 9, wherein said reaction mixture comprises solvent.

20. The method according to claim 19, wherein the pH of said reaction mixture is adjusted to a pH between about 2 and about 4 by means of an acid.

21. The method according to claim 20, wherein said solvent comprises alcohol and said reaction mixture is adjusted by means of nitric acid to a pH between about 2 and about 4.

22. A flexible solid electrolyte made according to the method of claim 9.

23. A method for making a colorless, transparent, flexible solid electrolyte adapted for use in an electrochromic device, said electrolyte comprising an interpenetrating polymer network of: (A) alkali metal doped, sol-gel component and (B) epoxy-amine component, said method comprising:

combining materials comprising (i) metal oxide precursor containing hydrolyzable alkoxy groups, (ii) polyether having at least one hydroxyl group per molecule, (iii) alkali metal salt, and, optionally, (iv) solvent to form a reaction mixture;

mixing said reaction mixture for a time at a temperature sufficient to react at least 50% of said hydrolyzable alkoxy groups present on said metal oxide precursor and form a viscous mixture;

mixing into said viscous mixture materials comprising (i) aliphatic diepoxide containing 10 or less carbon atoms and (ii) polyamine crosslinking agent containing at least two reactive amine groups, and subjecting said viscous mixture comprising said diepoxide and said polyamine crosslinking agent to a temperature sufficient to cure it and form said colorless, transparent, flexible solid electrolyte.

24. The method according to claim 23, which further comprises removing said solvent from the viscous mixture prior to curing said viscous mixture comprising said diepoxide and said polyamine crosslinking agent.

25. The method according to claim 23, which further comprises providing said viscous mixture comprising said diepoxide and said polyamine crosslinking agent, prior to curing, on a support.

26. The method according to claim 25, wherein said support is a component of an electrochromic device.

27. The method according to claim 26, wherein said support is selected from a layer of electrochromic material and a layer of electrode material.

28. The method according to claim 23, wherein said diepoxide contains between 9 and 11 carbon atoms.

29. The method according to claim 23, wherein said reaction mixture contains solvent.

30. The method according to claim 23, wherein the pH of said reaction mixture is adjusted to a pH between about 2 and about 4 by means of an acid.

31. The method according to claim 30, wherein said solvent comprises alcohol and said reaction mixture is adjusted by means of nitric acid to a pH between about 2 and about 4.

32. The method according to claim 23, wherein said reaction mixture is mixed for a time at a temperature sufficient to react at least about 100% of said hydrolyzable alkoxy groups present on said metal oxide precursor.

33. The method according to claim 23, wherein said component (A) and said component (B) are employed in a volume ratio of about 2:1.

34. The method according to claim 23, wherein said metal oxide precursor (i) and said polyether (ii) are combined in said reaction mixture in a volume ratio between about 2:1 and about 1:4.

35. A flexible solid electrolyte made according to the method of claim 23.

36. A method for making a colorless, transparent, flexible solid electrolyte adapted for use in an electrochromic device, said electrolyte comprising an interpenetrating polymer network of: (A) alkali metal doped, sol-gel component and (B) epoxy-amine component, said method comprising:

combining materials comprising (i) tetramethyl orthosilicate, (ii) tetra ethylene glycol, (iii) a lithium salt, and (iv) solvent comprising methyl alcohol to form a reaction mixture;

mixing said reaction mixture for a time at a temperature sufficient to react at least 50% of said alkoxy groups present on said silicate and form a viscous mixture;

mixing into the substantially solventless viscous mixture materials comprising (i) aliphatic diepoxide containing between about 9 and 11 carbon atoms and (ii) polyamine crosslinking agent containing at least two reactive amine groups, and subjecting said substantially solventless viscous mixture comprising said diepoxide and said polyamine crosslinking agent to a temperature sufficient to cure it and form said colorless, transparent, flexible solid electrolyte.

37. An electrochromic device comprising two substrates and therebetween: one electrode layer; an electrochromic layer; and another electrode layer, at least one of said one electrode layer and said other electrode layer being transparent and each electrode layer being in contact with a respective one of said substrates, an ion conductive layer to communicate ions to and from said electrochromic layer upon application of a voltage across said electrode layers, wherein said ion conductive layer comprises an interpenetrating polymer network of: (A) alkali metal doped, sol-gel component and (B) epoxy-amine component, said alkali metal doped, sol-gel component (A) being the reaction product of materials comprising: (i) metal oxide precursor containing hydrolyzable alkoxy groups, (ii) polyether having at least one hydroxyl group per molecule, and (iii) alkali metal salt, and said epoxy-amine component (B) being the reaction product of materials comprising: (i) polyepoxide and (ii) polyamine crosslinking agent containing at least two reactive amine groups.

* * * * *